Aug. 4, 1931.  L. G. BARTLETT  1,816,820
VEHICLE WHEEL
Filed Jan. 8, 1930  2 Sheets-Sheet 1
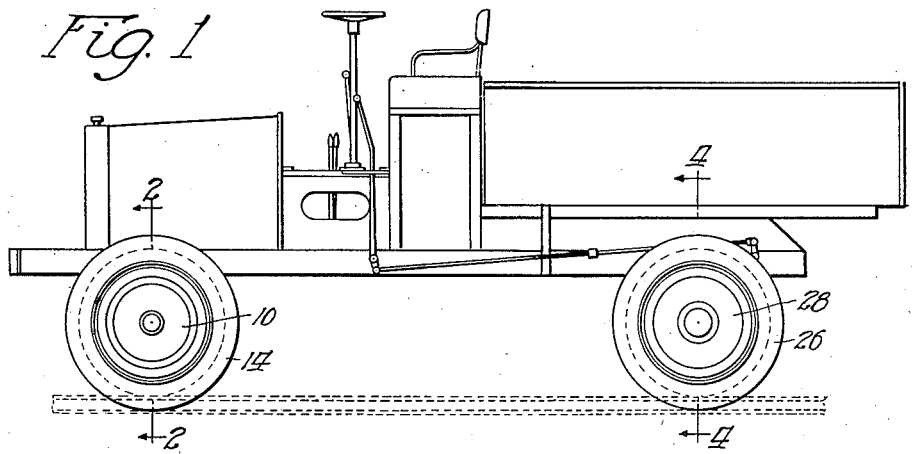
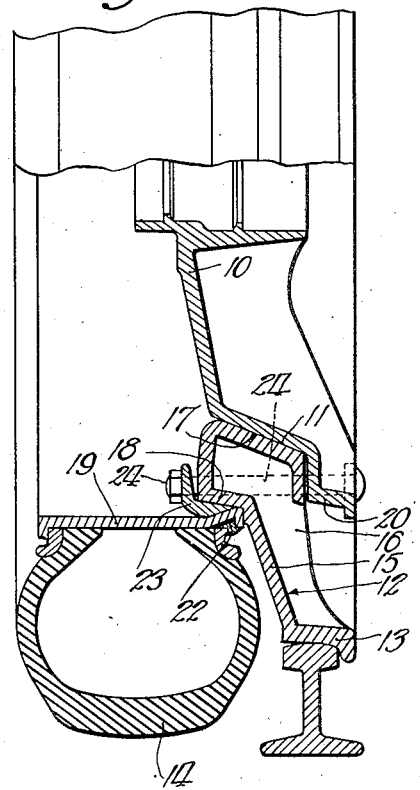
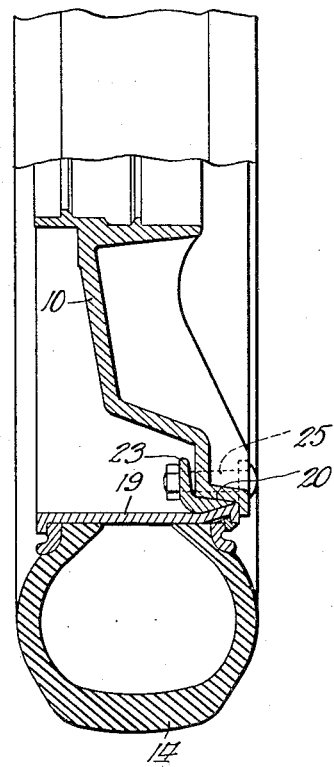
Inventor
Linton G. Bartlett
By Roland C. Rehm Attys

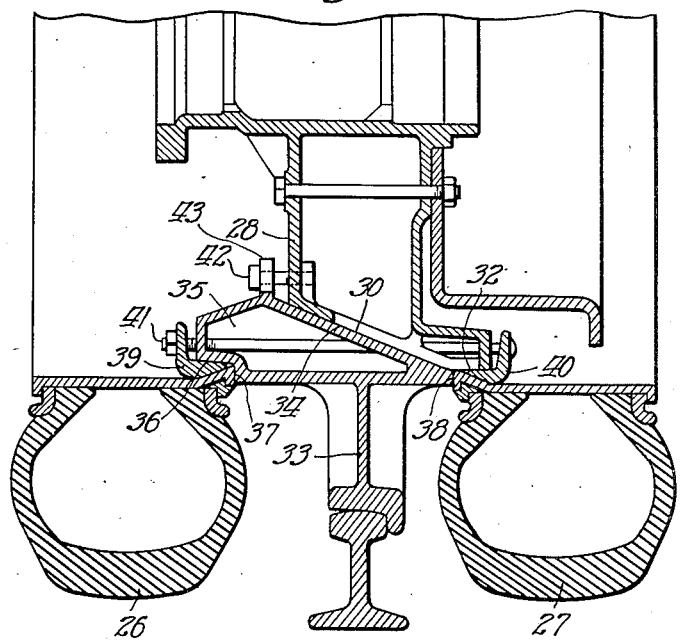

Patented Aug. 4, 1931

1,816,820

UNITED STATES PATENT OFFICE

LINTON G. BARTLETT, OF CHICAGO, ILLINOIS, ASSIGNOR TO WILLIAM L. O'CONNELL, OF CHICAGO, ILLINOIS

VEHICLE WHEEL

Application filed January 8, 1930. Serial No. 419,270.

This invention relates to vehicle wheels designed for both road and rail traffic; and, among other objects, aims to provide a simplified and easily manipulated construction of this character involving a minimum departure from standard practice and design.

The invention may be readily understood by reference to one illustrative construction embodying the invention and shown in the accompanying drawings.

In said drawings:

Fig. 1 is an elevation of a typical truck equipped with the dual purpose wheels, the relative locations of the rail and tread of the rail wheel being indicated in dotted lines.

Fig. 2 is a section taken on the line 2—2 of Fig. 1 showing the combined road and rail wheel for the front of the truck.

Fig. 3 is a section similar to Fig. 2 but in which the rail tread or wheel has been removed.

Fig. 4 is a section taken along the line 4—4 of Fig. 1 through the rear wheels and showing the combined road and rail wheel.

Fig. 5 is a section similar to that of Fig. 4 but in which the rail tread or wheel has been removed.

The illustrative construction is of particular utility for trucks required to run both on rails and road surfaces. Such a capability is required, for example, in track and subway construction where the truck runs on the usual construction rails in the subway and upon the roads after leaving the rails. The wheel designed for this purpose must be such as to permit traffic from rail to road and vice versa without substitution or addition of parts.

In the present instance the body or spider of the front truck wheel 10 follows generally accepted wheel design, the wheel in this case being a ribbed disc wheel. The usual outward deflection of the disc adjacent the rim is tapered to provide a flat surface 11 upon which is seated the rail wheel 12. The tread 13 of the rail wheel is of standard contour but its diameter is such as to bring the tread surface substantially inside that of the tire 14 even when a load is on the tires and they are perhaps somewhat under-inflated. The web 15 of the rail wheel is reinforced by radial ribs 16 which extend from the tread to the tapered inner surface 17 which engages and conforms in shape to the surface 11 on the wheel. The web 15 is offset at 18 to provide a standard tapered seat for the reception of the tire rim 19.

Corresponding in diameter and contour with the standard tire is a tapered seat 20 on the wheel disc. As shown in Fig. 2, the tire rim is beveled or tapered inwardly at 22 to form a tapered wedging surface by means of which the wheel is locked in place by the usual locking or wedging ring 23. This ring is held in place by bolts 24 located at spaced points around the wheel which pass through both the rail wheel and the margin of the wheel disc. The tightening of the bolts not only clamps the locking ring and tire rim in place by cooperation of the tapered surfaces involved but also draws the rail wheel tightly on the wheel disc through cooperation of the tapered surfaces 11 and 17.

The foregoing arrangement permits the wheel to run on both rails and road surfaces without addition or removal of parts and without interference of the rail wheel with the tire, or vice versa.

In the event the truck is not required to run on rails, for example, the weight of the wheel may be lightened by removal of the rail wheel. In this case (as shown in Fig. 3) the tire rim is locked in place against the tapered surface 20 on the wheel disc. In such event shorter bolts 25 are employed. For exclusive travel on rails the tire and rim may be removed.

In the present design the rear wheels have been shown provided with dual tires 26 and 27 as is common practice for heavy duty trucks. As was the case with the front wheels, the rear wheel structure or spider 28 may advantageously be generally of standard design. Its outer periphery is formed with a tapered surface 30 of substantial width and an oppositely inclined tapered surface 32 employed in connection with the attachment of the rim for tire 27. The rail wheel 33 is in the present case seated against the tapered surface 30 and for this purpose is provided with a correspondingly tapered seating surface 34; and it is hollowed out as indicated at 35 to reduce weight. Adjacent one edge of the rail wheel body, it is provided with an offset tapered surface 36 for the rim of tire 26. The inner edges of the rims for tires 26 and 27 seat against shoulders 37 and 38 on the rail wheel. The diameters of the tapered surfaces 32 and 36 are not only equal to each other but equal to the corresponding surfaces for the front wheels, thus permitting interchangeability of rims and tires. The rear tire rims are held in place by locking rings 39 and 40 as described in connection with the front wheels. These rims are held in place by bolts 41 which pass through the locking rings 39 and 40, the body of the rail wheel, and the wheel disc. The arrangement of the tapered surfaces is such that the assembled parts are wedged tightly in place. A series of bolts 42 passing through flange 43 and the wheel body draw the rail wheel firmly on the tapered seat 30.

As with the front wheel, the respective diameter of the rail wheel and tire is such that each may function without interference with the other.

To reduce weight, among other reasons, the rail wheel for the rear wheels may be removed in the event the truck is not required to operate on rails. In such case the rail wheel is replaced by a spacer ring 44 having a tapered surface 45 and shoulders 46 and 47 corresponding to those on the body of the rail wheel. The spacer may advantageously be designed so that the shoulders 46 and 47 are somewhat closer together than the shoulders on the rail wheel, thus permitting the tires to be mounted more closely together. To engage the tapered surfaces 30 the spacer is provided with tapered flanges 48 and 49 of appropriate diameters. This construction differs somewhat from that of the rail wheel but is resorted to to reduce weight inasmuch as the additional strength required for transmission of weight through the web of the rim wheel, is not necessary in the spacer. The interior of the spacer at 50 is hollow also to reduce weight.

The tire rims and locking rings are clamped in place by the bolts 41 which in the present case pass through the same holes in the wheel and locking rings and through registering holes in the spacer. The spacer is held in place by the same bolts 42 which serve for the rail wheel; and they pass through registering openings in flange 51 of the spacer which corresponds to flange 43 of the rail wheel.

It will be observed that the aforesaid construction not only generally follows accepted wheel design and practice, but permits the handling of minimum weights in changing tires or removing rail wheels as in standard practice. This avoids the necessity of handling the excessive weight of the entire wheel assembly at one time. The removal of bolts 41 simultaneously releases both tire rims; and the inner tire 27 and its rim may be removed without disturbing the wheel body, merely by first removing separately the outer tire and the rail wheel. It is apparent, therefore, that removal of any of the aforesaid parts involves the handling of minimum individual weights.

Obviously the invention is not limited to the details of the illustrative construction since these may be variously modified. Moreover, it is not indispensable that all features of the invention be used conjointly since various features may advantageously be employed in different combinations and sub-combinations.

Having described my invention, I claim:

1. A vehicle wheel for road and rail travel comprising in combination, a wheel body having a seating surface, a removable rail wheel seated against said surface, said rail wheel having a seat for a tire rim, and a tire rim seated against said seat, said wheel body having a seat corresponding to that on said rail body to receive said tire rim, whereby said rim may be seated against the latter seat in the event of removal of said rail wheel.

2. A truck wheel adapted for both road and rail travel comprising in combination, a wheel body having a peripheral seating surface, and a rail wheel and a cushion tire provided with means whereby both may be removably connected to said wheel, said rail wheel being of smaller diameter than said tire so that it will not contact with the road but being large enough to raise the tire from the ground when said rail wheel travels on a rail.

3. A truck wheel adapted for both road and rail travel comprising in combination, a wheel body having a peripheral seating surface, and a rail wheel and a cushion tire provided with means whereby both may be removably connected to said wheel, said rail wheel being of smaller diameter than said tire so that it will not contact with the road but being large enough to raise the tire from the ground when said rail wheel travels on a rail, the peripheral seat on said wheel body being formed to permit the removal of said rail wheel for operation of the wheel on the tire alone.

4. A vehicle wheel for road and rail travel comprising in combination, a wheel body having a seating surface, a removable rail wheel seated against said surface, said rail wheel and wheel body each being provided with tire rim seats for seating tire rims of the same diameter, and a tire rim seated against the rim seat on said rail wheel.

5. A vehicle wheel of the character described comprising in combination, a wheel body having a tapered seat on its periphery, a rail wheel having a tapered seat engaging said wheel seat, said tire wheel provided with a tapered rim seat, a rubber tired rim having a wedge locking ring engaging said rim seat, and connecting bolts passing through said wheel body, rail wheel and locking ring to draw said parts tightly on their respective seats.

6. A vehicle wheel of the character described comprising in combination, a wheel body having a tapered seat on its periphery, a rail wheel having a rail tread and a tapered seat engaging said wheel seat, and a cushion tire of larger diameter than said rail tread removably connected to said rail wheel and offset from said rail tread so that the wheel is adapted without adjustment for operation on road or rail.

7. A vehicle wheel of the character described comprising in combination, a wheel body having a tapered seat on its periphery, a rail wheel having a tapered seat engaging said wheel seat, said tire wheel provided with a tapered rim seat, a rubber tired rim having a wedge locking ring engaging said rim seat, said tapered surfaces being arranged to taper in the same direction, and connecting bolts passing through said wheel body, rail wheel and locking ring to draw said parts tightly on their respective seats.

8. A vehicle wheel of the character described comprising in combination, a wheel body having a tapered rim seat on its periphery, and a rail wheel removably connected to said body and having a tapered rim seat of the same diameter as that on said wheel body.

9. A vehicle wheel of the character described comprising in combination, a disc wheel body provided with a tapered tire-rim seated at its periphery and being offset at a point inside said rim seat to provide another tapered seat of smaller diameter, a rail wheel engaging the latter seat, said rail wheel having a tapered rim seat of the same diameter as that on said wheel body, and means for removably connecting said rail wheel to said wheel body whereby a tire rim may be connected either to the seat on said rail wheel or to said wheel body when the rail wheel is removed.

10. A vehicle of the character described comprising in combination, front and rear wheel bodies having tapered seats for rail wheels and having adjacent their peripheries tapered rim seats of identical diameter, rail wheels removably engaging said rail wheel seats, said rail wheels being provided with tapered rim seats identical in diameter with those on said wheel bodies, bolts adapted to pass through the wheel bodies, and respective tire rim structures to draw said parts tightly together, said bolts being removable to permit interchange of tires on said rim seats.

11. A vehicle wheel of the character described comprising in combination, a wheel body having a rail wheel seat and a tire rim seat on its periphery, a rail wheel engaging said rail wheel seat, said rail wheel having a tire rim seat of the same diameter as that on said wheel body, tired rims on said rim seats, and means connecting said parts together and to said wheel body.

12. A vehicle wheel of the character described comprising in combination, a wheel body having a rail wheel seat and a tire rim seat on its periphery, a rail wheel engaging said rail wheel seat, said rail wheel having a tire rim seat of the same diameter as that on said wheel body, tired rims on said rim seats, and a spacer having a rim seat corresponding to that on said rail wheel and constructed and arranged to engage the seat on said wheel body to replace the rail wheel.

13. A vehicle wheel of the character described comprising in combination, a wheel body having a rail wheel seat and a tire rim seat on its periphery, a rail wheel engaging said rail wheel seat, said rail wheel having a tire rim seat of the same diameter as that on said wheel body, said rim seats being oppositely tapered, tired rims on said seats, said rail wheel being interposed between said rims and having shoulders adapted to engage said rims, wedging locking rings for said rims, and bolts passing through said locking rings and wheel body to draw the parts tightly together.

14. A vehicle wheel of the character described comprising in combination, a wheel body having a tapered rail wheel seat and a tire rim seat on its periphery, a rail wheel engaging said rail wheel seat, said rail wheel having a tire rim seat of the same diameter as that on said wheel body, said rim seats being oppositely tapered and the rail wheel seat on said wheel body being tapered in the same direction as its rim seat, tired rims on said seats, said rail wheel being interposed between said rims and having shoulders adapted to engage said rims, wedging locking rings for said rims, and bolts passing through said locking rings and wheel body to draw the parts tightly together.

In testimony whereof, I have signed my name to this specification.

LINTON G. BARTLETT.